United States Patent [19]
Röthemeyer et al.

[11] Patent Number: 6,098,511
[45] Date of Patent: Aug. 8, 2000

[54] METHOD FOR CUTTING TO LENGTH AN UNVULCANIZED RUBBER STRIP MEMBER BY A CUTTING EDGE

[75] Inventors: Fritz Röthemeyer, Isernhagen; Horst Sergel, Hannover; Harald Kranz, Elze; Michael Glinz, Neustadt; Günter Homt, Garbsen, all of Germany

[73] Assignee: Continental Aktiengesellschaft, Germany

[21] Appl. No.: 08/995,808

[22] Filed: Dec. 22, 1997

[30] Foreign Application Priority Data

Dec. 24, 1996 [DE] Germany ............................ 196 54 408

[51] Int. Cl.⁷ ........................................................ B26D 7/10
[52] U.S. Cl. .................................... 83/16; 83/56; 83/171; 83/951
[58] Field of Search ............................... 83/16, 56, 171, 83/951, 614

[56] References Cited

U.S. PATENT DOCUMENTS

| | | | |
|---|---|---|---|
| 2,539,240 | 1/1951 | Firestone | 83/56 |
| 3,354,765 | 11/1967 | Frey et al. | 83/76 |
| 3,673,924 | 7/1972 | Zakrzewski . | |
| 3,732,767 | 5/1973 | Habert | 83/171 |
| 3,762,259 | 10/1973 | Kuts | 83/471.3 |
| 3,789,712 | 2/1974 | Enders | 83/171 |
| 4,334,448 | 6/1982 | Messerschmitt | 83/171 |
| 4,516,451 | 5/1985 | Takeshita et al. | 83/171 |
| 4,608,890 | 9/1986 | Still et al. | 83/56 X |
| 5,029,502 | 7/1991 | Irie | 83/614 X |
| 5,465,639 | 11/1995 | Senbokuya | 83/56 X |
| 5,613,414 | 3/1997 | Murphy et al. | 83/16 |

FOREIGN PATENT DOCUMENTS

| | | |
|---|---|---|
| 0220646 | 5/1987 | European Pat. Off. . |
| 0329130 | 8/1989 | European Pat. Off. . |
| 0701886 | 3/1996 | European Pat. Off. . |
| 0714740 | 6/1996 | European Pat. Off. . |
| 2458497 | 6/1979 | France . |
| 22445 | 10/1996 | United Kingdom . |

*Primary Examiner*—Rinaldi I. Rada
*Assistant Examiner*—T. Anthony Vaughn
*Attorney, Agent, or Firm*—Robert W. Becker & Associates

[57] ABSTRACT

A method for cutting to length a strip-shaped profiled member of unvulcanized rubber material by a cutting edge includes the step of providing a speed between the cutting edge and the profiled member to be cut of at least 2.5 m/s during the cutting action. The device for carrying out the method includes a carriage and a tool with a cutting edge fastened to the carriage. The carriage has an acceleration path, defined between a rest position of the carriage and a side of the profiled member facing the carriage, of between 0.2 and 1 m. The carriage has a deceleration path, defined between an oppositely arranged side of the profiled member and an end position of the carriage, of at least 0.1 m.

19 Claims, 1 Drawing Sheet

METHOD FOR CUTTING TO LENGTH AN UNVULCANIZED RUBBER STRIP MEMBER BY A CUTTING EDGE

BACKGROUND OF THE INVENTION

The invention relates to a method for cutting to length a strip-shaped profiled member made of unvulcanized rubber mixture by a cutting edge.

Rubber in the unvulcanized state exhibits a substantially plastic deformation behavior under load. This property is taken advantage of when shaping a rubber article. For articles where the shaping, on the one hand, and the vulcanization, on the other hand, are done in the same tool, conventionally called a vulcanization mode, the vulcanization speed is adjusted by the dosage of vulcanization accelerators, and optionally antagonistically acting vulcanization retarding agents, as well as the temperature curve such that during the first seconds up to a few minutes after introduction of the prepared green tire, especially during closing of the mold and optionally inflating of the green tire, the vulcanization is very slow so that the rubber is substantially still in a plastic state. For example, this allows for the highly precise imprinting of the tread pattern into the vehicle tire. Only after completion of imprinting vulcanization continues while the mode is still closed such that the unvulcanized rubber mixture turns into vulcanized rubber, i.e., its plasticity is greatly reduced in favor of increased elasticity. The rebound resilience of modern tire tread mixtures after vulcanization is approximately 70%.

A cutting edge is a sharp edge where two planar or slightly curved blade surfaces having a substantially constant angle, the ground angle, over the entire arc length of the cutting edge, meet. A knife is a tool for separating which includes a blade plus at least one further component having a different function, for example, a grip, a fasting device, a motor, etc.

For building respective green tires, diverse strip-shaped unvulcanized profiled members must be cut to length, for example, tread strips. Especially for unreinforced rubber strips, i.e. strips that do not contain reinforcement elements such as cords or cables, the problem that the cutting reaction force of the material to be cut, which is oppositely oriented to the cutting blade advancing force of the same amount, results in a permanent deformation of the material to be cut at both sides of the produced cut, which during the further production process makes joining of the different components more difficult and impairs the precision of the final product.

It is also well known that, when using a disc-shaped cutting edge, which is rotated at high speed, instead of a cutting edge which is to be moved only translatorily, the cutting reaction force can be lowered. For sufficiently small advancing speeds in relation to the circumferential speed (=2×pi×rpm of the knife) surprisingly clean cuts result. However, it has been observed that contaminants at the top surface are conveyed by the blade of the knife onto the freshly produced, and thus especially tacky, end face of the strip where they will remain. This impedes adhesive strength at the finished product. Furthermore, cutting devices with a rotating blade are rather expensive and prone to malfunction.

It is an object of the present invention to provide a method for cutting to length which no longer has the aforementioned disadvantages. Especially, the permanent deformation of the material to be cut to length resulting from the performed cut must be negligible and the contaminant transport from the top surface of the profiled member to be cut onto the cut end face must be prevented.

Furthermore, an especially reliable function during constant use in mass production of rubber products is desired, especially in the manufacture of pneumatic vehicle tires, especially for cutting to length the tread strip.

SUMMARY OF THE INVENTION

The object is inventively solved by a method according to claim 1. The inventive method for cutting to length an unvulcanized rubber profiled member by a cutting edge is characterized in that during performing the cut the speed between the cutting edge and the profiled member to be cut is at least 2.5 m/s.

While in the past an improved cut quality of the unvulcanized rubber pieces has been achieved by lowering the advancing speed of the cutting edge and, when using this approach, in a final improvement the required output density for separation was provided by rotating the cutting edge, this invention is based on the recognition that for an advancing speed of the cutting edge considerably above the conventional range, without any cutting edge rotation, practically deformation-free cuts and planar end faces can be produced.

The inventors explain this positive effect such that the macromolecules practically have no time to evade the advancing cutting edge. Accordingly, the material no longer acts plastically but elastically hard.

In this kind of separation apparently a destruction of some macromolecules of the polymer will result. However, this does not appear to impede the adhesive strength at the joining locations. To the contrary, in test results it has been shown that an increased adhesion strength in the finished product, especially tires, results.

The most favorable cutting speed during cutting to length is between 4 and 12 m/s. When employing this speed, on the one hand, the deformation is hardly measurable, and, on the other hand, the device can still be produced sufficiently inexpensively.

The cutting edge is preferably guided substantially parallel to the longest edge of the cross-section of the strip-shaped profiled member. Accordingly, the extension of the blade in regard to its height and thus its bending load and its mass can be kept small. This facilitates its acceleration, preferably with at least 60 m/s$^2$ to the inventively high cutting speed.

The short length of the cutting blade results, despite the minimal geometrical movement of inertia of the blade vertically to its height, in a sufficient torsional stiffness, so that torsional oscillations and thus induced bending oscillations of the blade can be suppressed to such an extent that no disruptive waviness in the cut surfaces will result.

Preferably, the cutting blade extends substantially at a right angle to the movement path of the cutting edge in order to maximize the hard-elastic separation behavior of the unvulcanized rubber. A slight inclination of the cutting blade can have the advantage that the material to be cut can be maintained especially tightly at the feed device by the downwardly oriented component of the cutting reaction force. Such an increased fixation avoids, without additional securing devices, bulging of the profiled edges upon being impacted by the cutting blade even for crosssectional profiled members having acute angles. When the cutting blade is slightly angled from the first mentioned perpendicular position, the stiffness of the cutting behavior is reduced only minimally. Accordingly, in the context of the cutting edge position relative to the travel path, the term substantially at a right angle is meant to indicate that the cutting blade, relative to the perpendicular alignment of the cutting edge, is slanted forwardly by at most 45° so that the angle between the cutting edge and the travel path is at least 45°.

Because of the practically prevented cutting reaction deformation when employing the inventive method, it is suggested to secure the profiled member to be cut to length without a counter blade. This not only results in a device which is especially inexpensive, but also makes it possible that the device, after performing a cut, can be employed quickly for the next cutting action. The device thus achieves an especially high output.

The cutting blade is heated so that the cutting edge when entering and exiting the material to be cut will not be lower than 140° C. The heating of the cutting blade facilitates the cutting action and allows cutting speeds down to 2.5 m/s. Furthermore, the cutting quality especially at the location of entering and exiting the material to be cut is improved.

From British Patent Application 22 445, dating back to 1896, a pressure actuated linear drive is known which can move great masses at great velocities. From U.S. Pat. No. 3,673,924, dating back to the year 1972, a pressure medium-actuated drive is also known which comprises a pair of pressure rollers with elastic hose positioned therebetween. This elastic hose is compressed by the two pressure rollers such that when the hose is loaded by pressure, the pressure rollers are moved by the pressure wave contained within the hose.

The cutting edge is driven by a known pressure medium-actuated linear drive. It comprises preferably a pressure reservoir for supplying the pressure medium into the hose. Such a pressure reservoir provides upon opening in an especially simple manner sufficient pressure medium in order to reach the required high cutting speed and acceleration with the pressure medium-actuated linear drive.

The preferred acceleration path for the cutting edge from its resting position until it impacts the profiled member to be cut to length is between 0.2 and 1 m. With this length, the preferred cutting speeds are achieved for acceptable constructive space and with minimal constructive expenditure. For the purpose of minimal constructive expenditure, an individual compressor is preferably not employed but, instead, the conventionally accessible compressed air pressure of 7 bar which is provided by a compressed air line network is employed and hoses with conventional flex loading resistance are used. A shorter of the acceleration path would be possible when increasing the employed air pressure and/or with increased compression of the hose and/or greater dimensioning of the inner diameter of the hose.

A tool with a cutting edge is connected to a carriage whereby the carriage is moveable along a path substantially parallel to the longest edge of the cross-section of the strip-shaped profiled member, whereby this travel path of the carriage is of such a length that between the resting position of the carriage and the side of the profiled member facing it an acceleration path ($S_a$) between 0.2 and 1 m is provided and between the oppositely arranged side of the profiled member and the end position of the carriage a deceleration path ($S_b$) of at least of 0.1 m is provided. The carriage supporting the cutting tool reaches along the acceleration path ($S_a$) a speed of at least 2.5 m/s is reached. The movement of the carriage in connection with the sharp cutting edge produces in the unvulcanized rubber a clean and precise cut of high quality of the cut surfaces.

The cutting edge is guided along a path substantially parallel to the longest edge of the cross-section of the strip-shaped profiled member. With this measure, the extension of the cutting edge in its height and thus its bending load and its mass can be kept small. This facilitates its acceleration, preferably with at least 60 m/s$^2$, to the inventively high cutting speed.

The substantially perpendicular position of the cutting edge relative to the displacement path, and thus also to the material to be cut produces an especially good cutting quality because when the cutting edge is guided substantially at a right angle to its travel path and thus also to the material to be cut, the unvulcanized rubber is separated in an ideal manner by hard-elastic behavior.

The device secures the profiled member without a counter blade. This not only makes the device especially inexpensive but also allows to return the device after performing a cut especially quickly into a position for the next cutting action.

The drive of the cutting tool-supporting carriage is a known pressure medium-actuated linear drive which has a pair of pressure rollers connected to the carriage and a hose of elastic wall, compressed between the two pressure rollers, whereby the hose with its longest extension is arranged substantially parallel to the cutting path. At one end of the hose a shut-off valve that in it open position which is selected at least for beginning the cutting process, provides the connection to the reservoir that is arranged directly adjacent thereto and is provided with a fluid that is under pressure, preferably, air. With such a drive the required high cutting speed is achieved in a simple and inexpensive manner.

BRIEF DESCRIPTION OF DRAWINGS

The invention will be subsequently explained in detail with the aid of the FIGURE. The FIGURE shows a side view of the device for high velocity transverse cutting of profiled members 1 which are guided by guide rails 9. The linear movement with the required high speed of at least 2.5 m/s is produced by a pressure medium-actuated linear drive.

DESCRIPTIONS OF PREFERRED EMBODIMENTS

Figure 1:
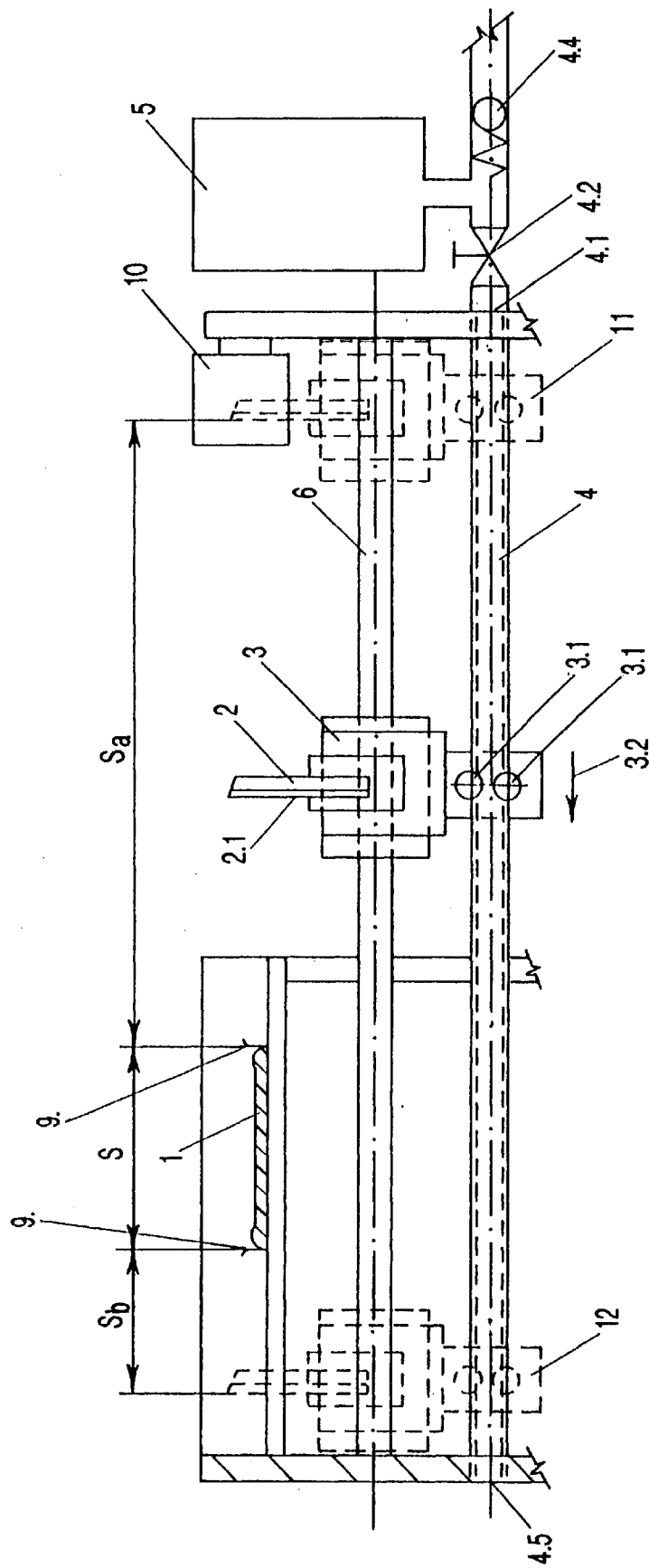

When the hose 4 of the pressure medium-actuated linear drive shown in the FIGURE, is loaded from the right side by the pressure inlet 4.1 by preferably abrupt opening of the shut-off valve 4.2 with pressure of approximately 7 bar, the two pressure rollers 3.1 are caused to perform a rolling movement on the hose 4 in the direction toward the left end of the hose which is under atmospheric pressure.

Even at high inner flow resistance within the compressed air supply network, a great acceleration of the carriage 3 is possible when arranging a pressure reservoir 5 downstream of the pressure inlet 4.1 which, if needed, allows flow of intermittently stored compressed air to the left and into the hose 4 of the linear drive. An undesirable flow of intermittently stored compressed air to the right is expediently avoided, as shown, by a check valve 4.4.

This movement in the direction 3.2 is used for the cutting process whereby the carriage 3 is guided by the linear drive 6. This linear guide is especially easily provided by a straight rail, but can also be curved. A spiral-shaped curvature of the acceleration path would result in an especially compact arrangement of the required acceleration path.

In order to be able to achieve the of the cutting blade of at speed of the cutting blade of at least 2.5 m/s, an acceleration path $S_a$ of 0.2 to 1 m length is required for the aforementioned air pressure.

The present invention is, of course, in no way restricted to the specific disclosure of the specification and drawings, but also encompasses any modifications within the scope of the appended claims.

The pressure within the pressure inlet 4.1 is reduced to atmospheric pressure at a suitable location, depending on acceleration and achieved speed of the carriage 3, if needed even before reaching the material to be cut to length. The blade speed however may not fall below 2.5 m/s during the cutting process.

After separation, the carriage 3 is braked within the deceleration path $S_b$ until it stands still. The deceleration path $S_b$ between the left edge of the profiled member 1 to be cut to length and the cutting blade 2.1 in the rest position 12 should be at least 0.1 m. Optionally, the pressure outlet 4.5 is supplied with pressure greater than atmospheric pressure in order to decelerate the carriage 3 additionally.

The cutting quality especially at the entrance and exit of the cutting edge into the material to be cut is considerably improved when the cutting edge 2 is heated by a stationary heating device 10 to such an extent that the cutting edge temperature will not fall below 140° C. even at the end of the cutting paths. Heating of the cutting edge in the shown representation is carried out when the carriage 3 is in its resting position 11. This eliminates a moveable energy supply and reduces the mass to be accelerated.

In order to return the carriage idle, i.e. without preforming a cut, to the right side and to prepare it for the subsequent cutting process, excess pressure is introduced at the pressure outlet 4.5 for a short period of time. For avoiding such an idle stroke, it is also possible, in a non-represented development of the aforementioned device, to provide the cutting blade with an additional edge at the right side and to provide to the left of the material to be cut a sufficient acceleration path. Then, the cutting edge cuts in a reciprocating manner with its right and left cutting edge.

We claim:

1. A method for cutting to length a strip-shaped profiled member of unvulcanized rubber material by a non-rotating cutting edge, said method comprising the step of:
providing a traversing speed between the non-rotating cutting edge and the profiled member to be cut of at least 2.5 m/s during the cutting action.

2. A method according to claim 1, wherein the traversing speed during the cutting process is between 4 and 12 m/s.

3. A method according to claim 1, further comprising the step of guiding the non-rotating cutting edge along a path substantially parallel to a longest edge of the cross-section of the profiled member.

4. A method according to claim 1, wherein the non-rotating cutting edge extends substantially at a right angle to the displacement path of the cutting edge.

5. A method according to claim 1, wherein the profiled member to be cut to length is secured without a counter blade.

6. A method according to claim 1, further including the step of providing an acceleration path for the non-rotating cutting edge, defined between a rest position of the non-rotating cutting edge and a location of entering the profiled member to be cut to length, having a length of between 0.2 and 1 m.

7. A method according to claim 1, further including the steps of heating the non-rotating cutting edge and maintaining the non-rotating cutting edge temperature when entering and exiting the material to be cut at a value not lower than 140° C.

8. A method according to claim 1, further comprising the step of driving the non-rotating cutting edge by a pressure medium-actuated linear drive.

9. A device for cutting to length a strip-shaped profiled member of unvulcanized rubber material by a non-rotating cutting edge, said device comprising a means for providing a traversing speed between the non-rotating cutting edge and the profiled member to be cut of at least 2.5 m/s during the cutting action.

10. A device according to claim 9, further comprising:
a carriage;
a tool with a non-rotating cutting edge fastened to said carriage;
said carriage, driven by said means, having an acceleration path, defined between a rest position of said carriage and a side of the profiled member facing said carriage, of between 0.2 and 1 m;
said carriage having a deceleration path, defined between an oppositely arranged side of the profiled member and an end position of said carriage, of at least 0.1 m, whereby said carriage attains a traversing speed of at least 2.5 m/s along said acceleration path.

11. A device according to claim 10, wherein said traversing speed is between 4 and 12 m/s.

12. A device according to claim 10, wherein said carriage is moved along a travel path substantially parallel to a longest edge of the cross-section of the profiled member.

13. A device according to claim 12, wherein said non-rotating cutting edge is substantially positioned at a right angle to said travel path of said carriage.

14. A device according to claim 10, wherein the profiled member is secured without a counter blade.

15. A device according to claim 10, wherein said means comprises a pressure medium-actuated linear drive for driving said carriage, said drive comprising a pair of pressure rollers fastened to said carriage and a hose with elastic wall, said hose compressed between said two pressure rollers, whereby said hose is arranged with its longest extension substantially parallel to said acceleration path.

16. A device according to claim 10, further comprising a stationary heating device positioned at the beginning of said acceleration path for heating said non-rotating cutting edge.

17. A device according to claim 10, further comprising a stationary heating device positioned at said resting position for heating said non-rotating cutting edge.

18. A device according to claim 10, further comprising a stationary heating device positioned at said resting position and at the beginning of said acceleration path for heating said non rotating cutting edge.

19. A device according to claim 10, wherein said heating device has a temperature of approximately 220° C.

\* \* \* \* \*